June 11, 1946.  E. A. CLAPP ET AL  2,401,722

MULTIELECTRODE WELDING HEAD

Filed Oct. 20, 1944  2 Sheets-Sheet 1

INVENTORS
EDWIN A. CLAPP
LEONARD V. SPANGBERG
BY
*E. Greenewald*
ATTORNEY

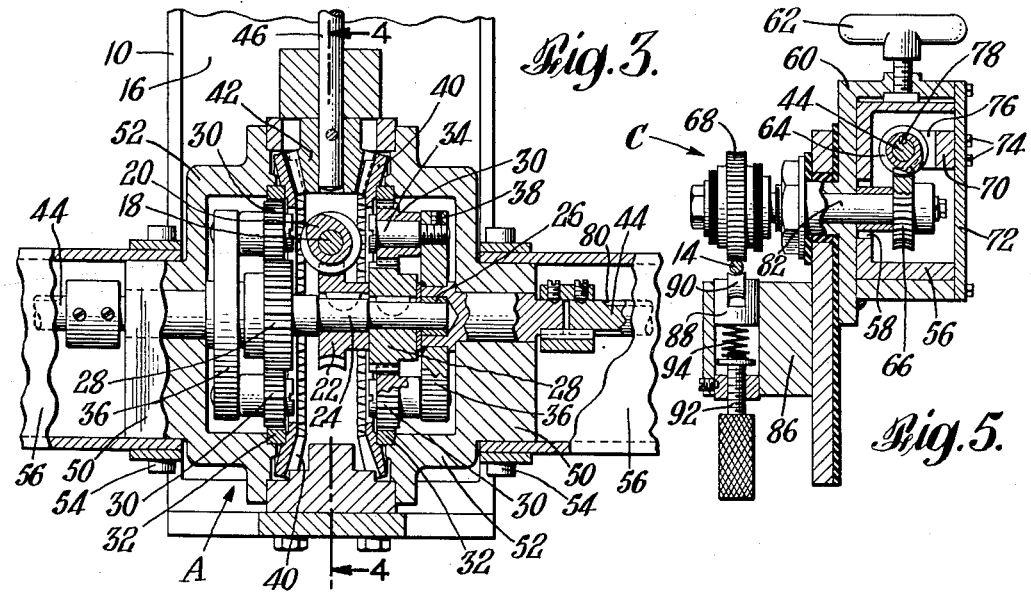
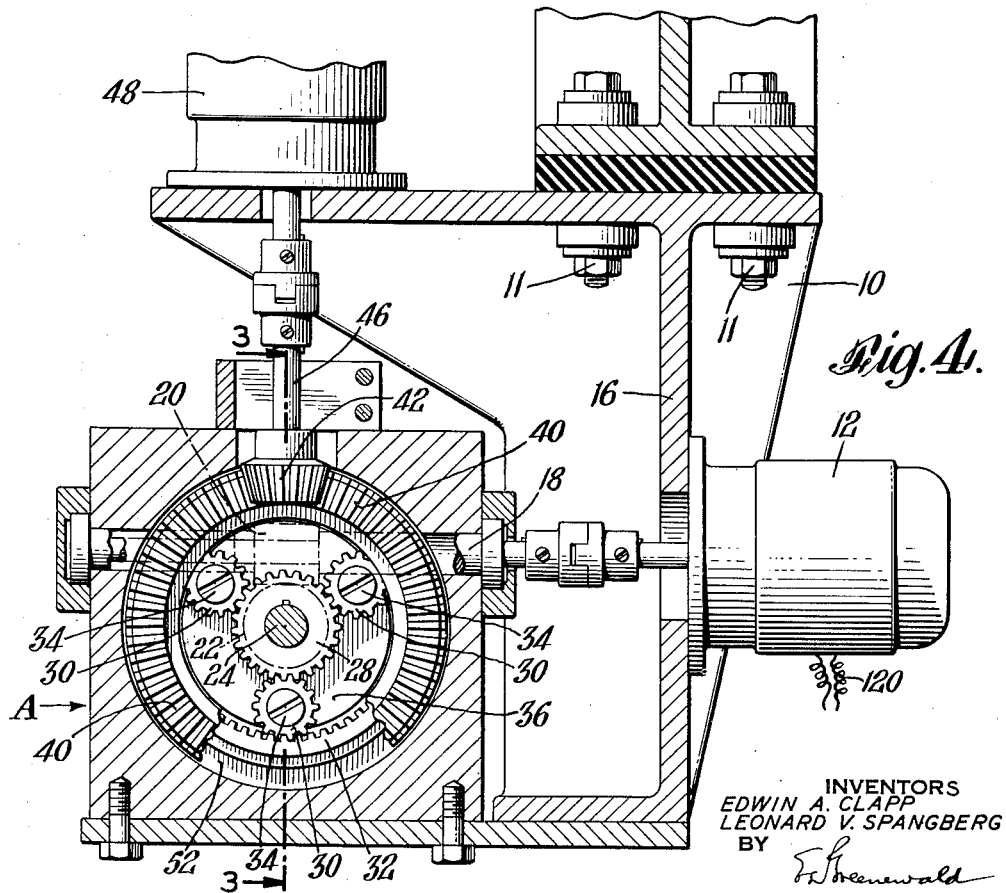

Patented June 11, 1946

2,401,722

UNITED STATES PATENT OFFICE 2,401,722

MULTIELECTRODE WELDING HEAD

Edwin A. Clapp, Niagara Falls, and Leonard V. Spangberg, Youngstown, N. Y., assignors to The Linde Air Products Company, a corporation of Ohio Application October 20, 1944, Serial No. 559,608

5 Claims. (Cl. 219—8)

This invention relates to electric welding, and more particularly to a multi-electrode welding head.

The welding head of the invention is especially adaptable to the welding process described by Lloyd T. Jones, Harry E. Kennedy, and Maynard A. Rotermund, in their U. S. Patent 2,043,960 issued June 9, 1936. Such process generally comprises electrically welding beneath a blanket of an unbonded mineral-like composition of high electrical resistance in the unfused condition. During welding, the electrode is continuously fed toward the work, while the supporting mechanism for the electrode is simultaneously moved along the welding line, successive portions of the welding composition being fused to act as a blanketing medium for the electrical discharge. The end of the electrode is fused by the heat of the discharge and the high resistance of the welding composition, as is the metal of the workpiece in the zone immediately adjacent the discharge. Although the invention is herein described with especial reference to such process of Jones, et al., it is not limited to such process.

There exist applications of such welding process in which heretofore disclosed equipment for carrying out the welding process is neither economical nor convenient. For example, fillet welds on the two sides of a web presently require two separate welding operations. On occasion, when the needs demand it, these two operations are carried on simultaneously using two duplicate sets of equipment. One of the objects of the present invention is to provide a welding head comprising two electrodes by means of which the two welds may be made simultaneously, with one welding ensemble, with resultant saving of time, and making valuable equipment available for other work, a feature now greatly to be desired when manufacturing facilities are hard-pressed to meet the demands of the armed forces.

Another field of application of the welding head of the invention is that of metal veneering, particularly when relatively little penetration of the veneer into the base metal is desired. In such case the discharge is produced between the electrodes rather than between the electrode and the workpiece, the latter being melted to only a slight depth. Dilution of the electrode material by that of the plate is thus minimized.

A particular advantage of the invention lies in the fact that by using electrodes of different chemical analyses, the composition of the weld metal in the case of single welds, or the deposited surface metal in the case of veneering, can be altered or controlled within relatively wide limits.

In the operation of equipment of the character described, namely, multi-electrode welding devices, it is of considerable importance that proper control be provided for equalizing the welding voltages of the respective electrodes, since there will always exist a tendency for such voltages to differ due, principally, to minor variations in the electrode dimensions. Thus, with electrodes of slightly different diameters, the smaller of the two will melt off more rapidly than the other when identical currents flow therethrough—as in a series circuit—with the result that the distance between the electrode tip and the workpiece, in the case of the smaller electrode, will gradually become greater than the corresponding distance in the case of the larger, the two zones then not operating at the same welding voltage—welding voltage being a function of distance. This effect becomes more pronounced as the electrode diameter is decreased.

Means for accomplishing the adjustment of the relative distances between the electrode tip and workpiece are provided in the present invention, through a specially designed differential feed control mechanism by means of which the arc lengths are varied, as required, by automatic adjustment of the relative positions of the two electrodes. As described later, angular movement of a shaft causes one electrode to advance and the other to retract. This occasional adjusting motion of advancement and retraction respectively, which occurs only upon and during turning of said shaft, is superimposed on the normal electrode feed motion in a manner that will be made clear as the description proceeds. It is thus possible to maintain a substantially constant welding voltage without interruption or appreciable alteration of the rate of electrode feed.

In the drawings:

Fig. 3 is a sectional view taken on line 3—3 of Fig. 4;

Fig 4 is a sectional view taken on line 4—4 of Fig. 3; and

Fig. 5 is an enlarged sectional view taken on line 5—5 of Fig. 2.

Figure 2:
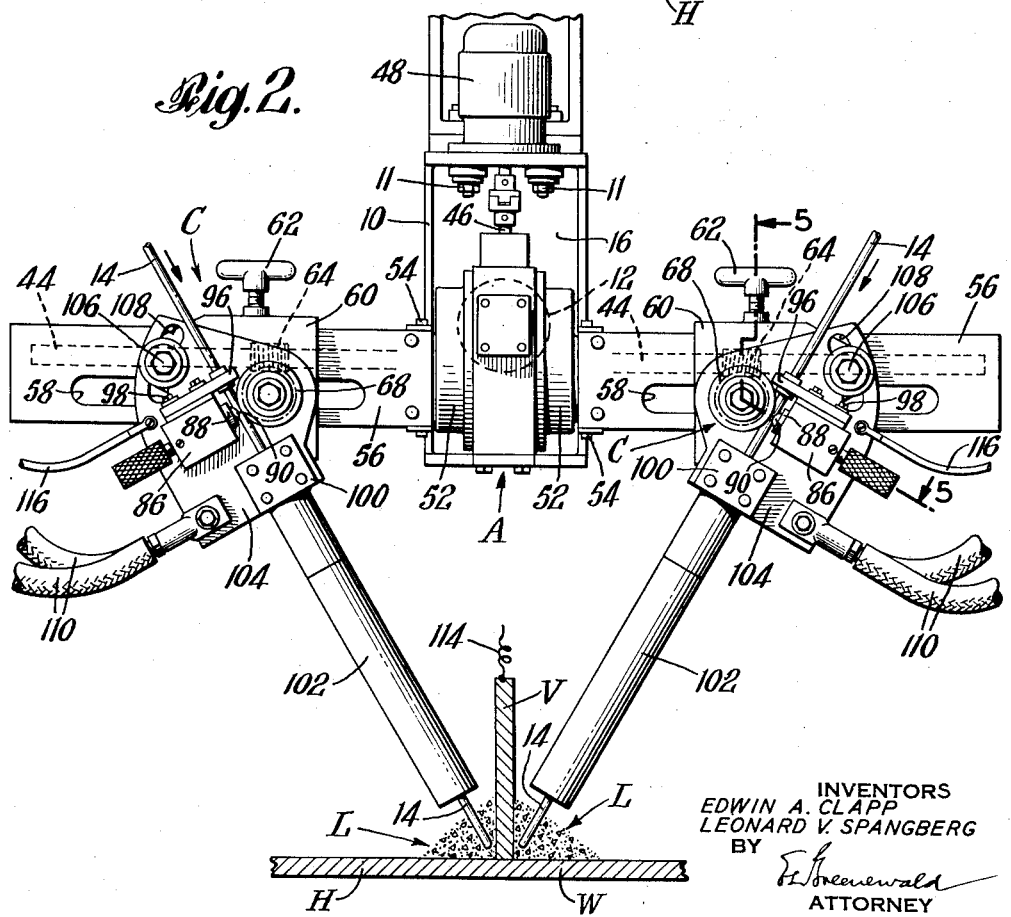
Fig. 2 is a fragmentary view in front elevation of said head.

Referring to Figures 2, 3 and 4, a bracket 10, which is adapted suspendably to support the compages of the invention, is mountable on the base of standard welding equipment, such mounting being through insulated bolts 11. A motor 12, which supplies feed motion to welding electrodes 14, is attached to the rear of the bracket 10 by means including a plate 16. Such motor mounting permits the substitution of motors of various types. The plate 16 is provided with appropriate holes (not shown) to accommodate the bolts of different motor supports.

The electrode feed motion is transmitted through a differential feed control mechanism A, by means including a shaft 18 (Figs. 3 and 4), and a worm 20 engaging a worm gear 22, fixedly mounted on a shaft 24. The shaft 24 is free to revolve in two bronze bushings, one of which is indicated at 26. It should be noted throughout this description of the differential feed control mechanism that, as indicated in the drawings, a given machine part on one side of the center line has an identical mate on the opposite side, some of which parts are shown in section.

Also fixedly mounted on the shaft 24 are sun pinion gears 28 of simple epicyclical gear systems comprising also planet pinion gears 30 and internal ring gears 32. Figure 4 clearly illustrates such a system. The pinion gears 30 are rotatably mounted on threaded studs 34 which are rigidly retained in a plate 36 by means including set screws 38.

Since bevel gears 40, held stationary by a bevel pinion 42, are fixed to the internal ring gears 32, the planet pinion gears 30 are caused, by rotation of the sun pinion gear 28, to roll about the latter within the ring gears 32, causing, in turn, rotation of the plate 36 on which such gears 32 are mounted. Shafts 44, which are connected to such plates 36, are thus caused to turn, the motion being transmitted to the electrodes 14 in a manner to be described later.

The single bevel pinion 42 is fixedly mounted on a shaft 46, which is turnable by a motor 48, or equivalent means, and meshes with the bevel gears 40, which are fixed to the internal gear 32. Being supported between the bevel gears 40, and rotatable therebetween by movement of the shaft 46, as described, the internal ring gears 32, upon rotation of the bevel gear 42, produce opposite-directional motion in the respective sets of planetary pinion gears 30. Since, however, in normal operation such pinion gears 30 are already in motion, such motion deriving, as above described, from the motor 12, the resultant effect of the new, superimposed motion on the pinion gears 30 is a momentary speeding up and slowing down, respectively, of the plates 36 such alteration in the original motion continuing only while an angular motion is being given the shaft 46. If the motor 12 is stationary during rotation of the shaft 46, such rotation will result in an advance and a retraction, respectively, of the electrodes 14.

By thus properly altering the characteristics of the electrode feed, the discharge distances, or arc lengths, of the electrodes can be adjusted to bring about an equalization of the welding voltages of the respective electrodes. In actual operation the shaft 46 is automatically actuated to retain the needle of a differential voltmeter 49, connected, for example, as shown in the circuit illustrated in Fig. 1, which represents substantially that used with the device of the invention, at the zero mark.

Maintenance of the welding voltage at a predetermined constant value is accomplished through voltage control equipment including a unit B which operates to control the speed of the motor 12.

On appropriately shaped bosses 50 on the outer sides of closure members 52 of the electrode differential feed control housing, by means including screws 54, and with their open sides facing rearwardly, are fixed channel members 56, each of which is provided through the greater portion of its length with a blind slot 58. Electrode feed mechanism support members 60, also channel-like in cross-sectional form, telescope over the channel members 56 for free sliding movement longitudinally thereon, but are securable thereto at any desired point by means including set screw and wing nut assemblies 62.

Referring to Figs. 2 and 5, and considering only one side of the ensemble, the same being duplicated on the opposite side, advancement of the electrodes 14 is accomplished through, successively, the shaft 44, a worm 64 and worm gear 66, and a knurled electrode feed wheel 68. The worm 64 is positioned within a yoke 70 fixed to a back cover plate 72 of the electrode feed mechanism support member 60 by means including bolts 74 (Fig. 5), the arms 76 of the yoke, between which the worm 64 is disposed, acting to restrain such worm from any longitudinal motion along the shaft 44 independent of that of the entire electrode feed mechanism assembly C. On its interior bore, the worm 64 is provided with a key 78 engaging a keyway or slot 80 on the shaft 44 (Fig. 5), thus permitting free axial movements along the shaft 44 of the electrode feed mechanism assembly C.

In addition to the worm gear 66, shaft 82 carries, exteriorly of the electrode feed mechanism support housing, the insulated electrode feed wheel 68, peripherally grooved for the accommodation of the electrode 14, and knurled to urge the electrode in forward motion upon rotation of the feed wheel 68.

The electrode 14 may be held in pressing relation to the knurled peripheral surface of the feed wheel 68, by any suitable biasing means. For example, as illustrated in Fig. 5, within housing 86 is slidably disposed an insulated pressure piston 88, in the recessed forward end of which is appropriately mounted a grooved roller 90. Adjustment of the biasing pressure is accomplished through movement of a screw 92 which acts through a compression spring 94 against the piston 88.

The electrode 14 passes through a tubular aligning guideway (Fig. 2) in a lug 96, the latter being integral with the pressure piston housing 86, or attached to it, as shown, by means including bolts 98; thence through the gate between the knurled feed wheel 68 and the grooved roller 90, electrode holders 100, and Bakelite or fibre covered tubular extensions 102, to the zone L of operation. Within the extensions 102 are located copper jaws with which the electrodes 14 make sliding electrical contact. The various parts of the feed assembly C are disposed about a generally sector shaped plate 104 which is adjustably mounted for limited angular movement about the axis of the shaft 82, thus permitting adjustment of the angularity of the electrodes 14, the plate 104 being securable in any desired position by a bolt and washer assembly 106, which coacts with an arcuate slot 108 in the plate 104. In a similar manner, release of the wing nut 62 permits lateral movement of either electrode 14 by longitudinal movement of the electrode feed mechanism support member 60 on the member 56, the slot 58 permitting free movement therethrough of the shaft 82.

Welding power is conducted to the electrode through cables 110 from a suitable source, such as a transformer 112; the electrodes being in series circuit relation with the work W which includes a horizontal plate H and a vertical plate or web V resting on the horizontal plate.

Figure 1:
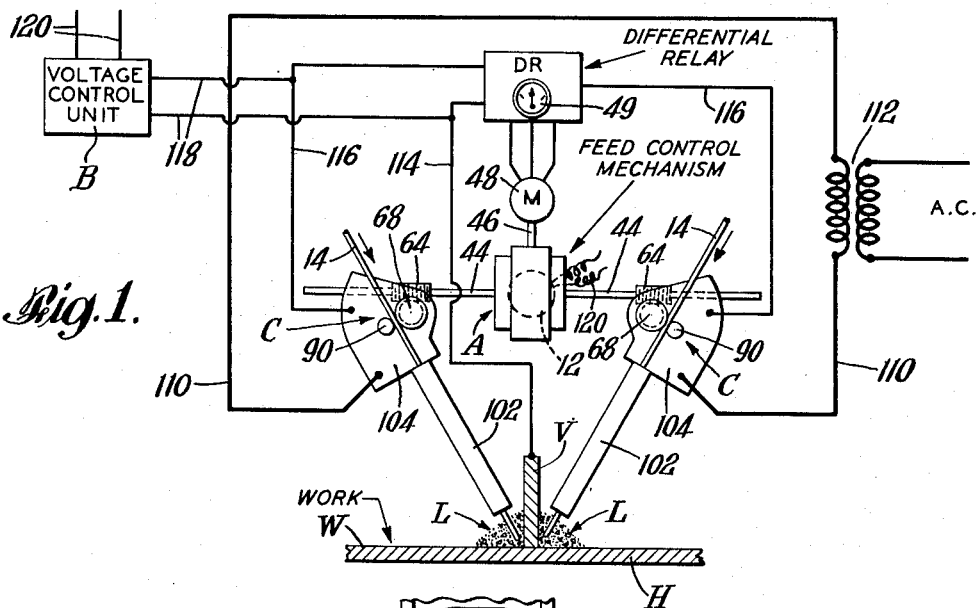
Fig. 1 is a diagrammatic representation of a welding head exemplifying the invention.

The operation of the apparatus of the invention, specifically the operation of the shaft 46, is entirely automatic, the automatic equipment being responsive to electrode discharge characteristics, and functioning to continuously maintain constant the desired electrode welding voltages. As shown in Fig. 1, such equipment includes a welding voltage differential relay DR which is connected by conductors 114 and 116 to the vertical plate V and electrodes 14, the circuit arrangement being such that the motor 48 is energized to turn the shaft 46 to operate the differential feed control mechanism A so as to keep the voltage between the work and each of the electrodes substantially equal in value by differentially feeding such electrodes to compensate for any difference in such voltage values. The voltage control unit is connected by conductors 118 across one welding zone L, so that the output circuit 120 of such unit is responsive to the welding voltage and operates the motor 12 to keep such voltage substantially constant by changing the electrode feeding rate to compensate for any change in the value of such voltage. The work W may be moved during the welding operation, or the welding equipment may be mounted on a carriage which moves with respect to the work W.

What is claimed is:

1. In combination, a pair of electrode feed devices for feeding a pair of electrodes toward a common conductor in series circuit relation with said electrodes, means for driving said devices including a motor which is responsive to the voltage between one of said electrodes and the common conductor so that such voltage is kept substantially constant, a differential feed control mechanism connected between said devices, and means for operating said mechanism including a motor which is responsive to the voltage differential between each electrode and the common conductor so that the voltages between such conductor and each of the electrodes are kept substantially equal.

2. A welding head equipped with at least two electrodes for simultaneously depositing at least two welding beads, comprising supports and mounting brackets, electrodes and electrode feed mechanism, a motor to provide motion for said electrode feed mechanism, and a differential feed control mechanism for superimposing upon the original normal electrode feed motion a secondary motion comprising advancement and retraction respectively of the electrodes, and means for controlling such secondary motion in accordance with the voltage differential between the respective electrodes at any given instant and resulting in an equalization of the welding voltage of the respective electrodes by appropriate adjustment of the discharge distance between the respective electrodes and the work.

3. A multi-electrode welding head comprising an electrode feed mechanism, a motor for driving said mechanism, a differential feed control mechanism by means of which there is superimposed upon the original normal electrode feed motion a secondary motion comprising advancement and retraction respectively of the electrodes, and means acting to control such secondary motion in response to the voltage differential between the respective electrodes and resulting in an equalization of the welding voltage of the respective electrodes by appropriate adjustment of the discharge distance between the respective electrodes and work in series circuit relation with such electrodes.

4. A multi-electrode head comprising an electrode feed mechanism, a motor for driving said mechanism, a differential feed control mechanism by means of which there is superimposed upon the original normal electrode feed motion a secondary motion comprising advancement and retraction respectively of the electrodes, and means acting to control such secondary motion in response to the discharge distance between the respective electrodes and work in circuit relation with such electrodes.

5. In combination, a pair of electrode feed devices, means for driving both of said devices comprising a common motor, and a differential feed control mechanism connected between said devices for changing the relative rates at which said devices are driven with respect to each other by said motor.

EDWIN A. CLAPP.
LEONARD V. SPANGBERG.